(12) United States Patent
Parra

(10) Patent No.: US 10,108,480 B2
(45) Date of Patent: Oct. 23, 2018

(54) DATA STREAM PROCESSOR AND METHOD TO COUNTERACT ANOMALIES IN DATA STREAMS TRANSITING A DISTRIBUTED COMPUTING SYSTEM

(71) Applicant: HomeAway.com, Inc., Austin, TX (US)

(72) Inventor: Rene X. Parra, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 79 days.

(21) Appl. No.: 14/935,215

(22) Filed: Nov. 6, 2015

(65) Prior Publication Data

US 2017/0132068 A1    May 11, 2017

(51) Int. Cl.
    *G06F 11/34*    (2006.01)
    *G06F 11/07*    (2006.01)
    (Continued)

(52) U.S. Cl.
    CPC ...... *G06F 11/0793* (2013.01); *G06F 11/0709* (2013.01); *G06F 11/3409* (2013.01); *G06F 11/3428* (2013.01); *H04L 41/00* (2013.01); *G06F 11/34* (2013.01); *G06F 2201/87* (2013.01); *H04L 43/50* (2013.01)

(58) Field of Classification Search
    CPC .. G06F 11/34; G06F 11/3404; G06F 11/3409; G06F 11/3466; G06F 11/3495; G06F 2201/87; G06F 2201/875; G06F 2201/88; G06F 11/3428; H04L 43/50
    See application file for complete search history.

(56) References Cited

U.S. PATENT DOCUMENTS

| | | | | |
|---|---|---|---|---|
| 7,817,563 B1 * | 10/2010 | Buragohain | ........ | G06F 11/3419 370/241 |
| 2013/0150094 A1 * | 6/2013 | Yang | ..................... | H04L 41/026 455/458 |

(Continued)

OTHER PUBLICATIONS

Wikipedia's Computer File historical version published Nov. 1, 2015 https://en.wikipedia.org/w/index.php?title=Computer_file&oldid=688560422 (Year: 2015).*

*Primary Examiner* — Joseph O Schell
(74) *Attorney, Agent, or Firm* — Knobbe, Martens, Olson & Bear, LLP

(57) ABSTRACT

Various embodiments relate generally to electrical and electronic hardware, computer software and systems for controlling a data stream processor configured to detect and/or resolve anomalies in data streams including message data. In particular, a system, a device and a method may be configured to access multiple data streams and to detect an anomaly, in real-time or in substantially real-time, that is associated with at least one of the data streams accessed by a data stream processor. In some examples, a method can include one or more of receiving message data to facilitate a computerized rental of property, classifying subset of messages, fetching the classified messages to form multiple data streams, accessing the data stream to indemnity a stream characteristic, detecting an anomaly based on an identified stream characteristic, and generating anomaly resolution data to counteract the detected anomaly.

20 Claims, 10 Drawing Sheets

(51) Int. Cl.
*H04L 12/24* (2006.01)
*H04L 12/26* (2006.01)

(56) References Cited

U.S. PATENT DOCUMENTS

| 2014/0006614 A1* | 1/2014 | Bali ................... H04L 41/5019 |
| | | 709/224 |
| 2014/0222696 A1* | 8/2014 | Ashby ................... G06Q 50/16 |
| | | 705/313 |
| 2015/0120914 A1* | 4/2015 | Wada ...................... H04L 43/04 |
| | | 709/224 |
| 2015/0256435 A1* | 9/2015 | Sum ........................ H04L 69/28 |
| | | 702/62 |

* cited by examiner

DATA STREAM PROCESSOR AND METHOD TO COUNTERACT ANOMALIES IN DATA STREAMS TRANSITING A DISTRIBUTED COMPUTING SYSTEM

FIELD

Various embodiments relate generally to electrical and electronic hardware, computer software and systems, and wired and wireless network communications for controlling a data stream processor configured to detect and/or resolve anomalies in data streams that include message data within a distributed computing system environment. In particular, a system, a device and a method may be configured to access multiple data streams and to detect an anomaly in real-time, or in substantially real-time, that is associated with at least one of the data streams accessed by a data stream processor.

BACKGROUND

Vacation rental marketplaces in which disparate owners of second or vacation homes have experienced increasing growth recently. In a vacation rental marketplace, a family or a group of people (e.g., group of friends) may rent anything from cabins, condominiums, summer homes, to villas, barns, farm houses, and castles. These types of rental properties are desirable as typical hotel or motel buildings are not well-suited to accommodate families or groups of people, and are usually less private and less comforting to some guests.

With the advent of networked computing devices, the computer-based renting of properties electronically has enabled travelers to more readily enjoy the experiences of renting others' homes. However, some conventional techniques and known technological approaches to renting properties via computer networks typically employ an increasing numbers of computing systems (e.g., hundreds or thousands of computing devices, including servers and databases) over which those computing systems are distributed conventionally or arranged using typical sharded database schemas. Further, increasing amounts of data are being processed by and among numerous and disparate networked computing devices, which, in turn, complicates and hinders error detection and resolution through conventional trouble-shooting techniques.

While conventional trouble-shooting techniques are functional, some known approaches to detecting and resolving errors in data stream communications are less than optimal when applied to computing systems consuming greater amounts of data at faster transmission rates and requiring greater throughput. In particular, some conventional approaches to error detection in high-speed data channels having high-throughput are not well-suited to archive large numbers of attributes to determine historically whether a particular data communication channel is operating normally or abnormally.

As such, common approaches to error detection and resolution may be relatively costly in terms of computing resources, manpower, and capital. Thus, an entity (e.g., a corporate entity) may experience degradation of performance in the operability of its computing resources, which, in turn, reduces the efficacy of serving data, such as webpages, to prospective consumers of data. For example, the entity may specify a range of acceptable response times (e.g., in accordance with a service level agreement, or SLA) to provide a specific response time to a computing device based on criteria set forth in inquires to a distributed computing system. Typically, conventional error detection is not well-suited to detect spikes or abnormalities in response times (e.g., in real-time). As such, conventional error detection techniques are suboptimal in identifying abnormalities in the performance of data streams within distributed computing systems. Thus, users may experience relatively "slow" data accesses that may be perceived as delays in network or communications.

Thus, what is needed is a solution for anomaly detection and resolution in a data stream processor disposed in a distributed computerized rental system that processes numerous data streams, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
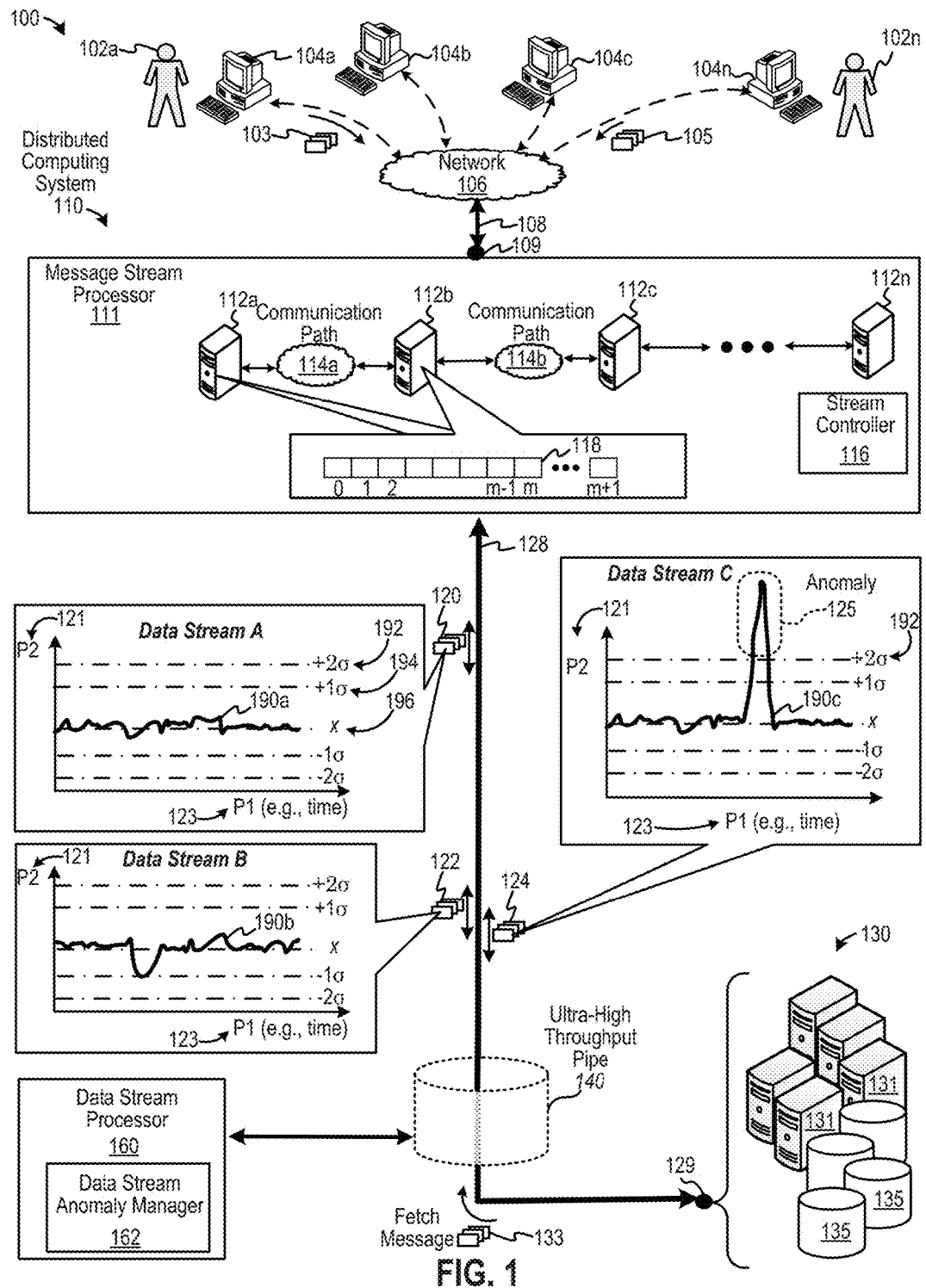
FIG. 1 is a diagram depicting a data stream processor including a data stream anomaly manager, according to some embodiments.

FIG. 1 is a diagram depicting a data stream processor including a data stream anomaly manager, according to some embodiments. Diagram 100 includes a data stream processor 160 including a data stream anomaly manager 162 that may be configured to, among other things, facilitate real-time (i.e., near real-time) detection of one or more anomalies associated with a data stream among numerous data streams associated with distributed computing system 110. Distributed computing system 110 is configured to provide an infrastructure to implement a networked computerized system configured to facilitate rental of vacation property (or other data-supported transactions) via a network 106 (e.g., the Internet) with a computing device 104a, a computing device 104b, a computing device 104c, a computing device 104n, and the like. Hundreds or thousands (or more) computing devices, such as computing devices 104a to 104n, may transmit, for example, 15,000 to 20,000 calls per second into distributed computing system 110. As another example, more than 20,000 calls or subsets of message (e.g., 2 million calls per second or greater) may be communicated with distributed computing system 110.

In the example shown, a user 102a, such as a prospective traveler, may cause computing device 104a to generate a call 103 via network 106 and via communications path 108 to distributed computing system 110. Call 103 can include message data that is generated responsive to interactions with a user interface of computing device 104a. For example, call 103 may include message data configured to facilitate a search of rental properties based on certain property characteristics (e.g., location, number of bedrooms, number of bathrooms, etc.), facilitate presentation of the specific property listing, invoke an electronic message application (e.g., to enable communication, such as email communications, between travelers and owners) in a dashboard presented on the user interface, invoke control data and the like. Similarly, a user 102n, such as an owner, may cause computing device 104n to transmit a call 105 to distributed computing system 110. According to various examples, calls 103 and 105 may include a subset of message data configured to request other data, data configured to cause generation of new data based on execution of code, data configured to transfer control to a program (e.g., a method), or other like data.

Distributed computing system 110, according to the example shown in diagram 100, may include a message stream processor 111 and a pool 130 of any number of servers 131 and databases 135, including storage devices and memory. Note that any of servers 131 or databases 135 may be co-located in, or distributed over, any number of geographic regions. Message stream processor 111 may be configured to provide a data conduit or data channel (e.g., "data pipe") having a relatively ultra-high throughput for data passing through messages stream processor 111, or between points 109 and 129 (e.g., through message stream processor 111 and path 128). Message stream processor 111 may also be configured to provide a relatively low latency through messages stream processor 111, or between points 109 and 129 (e.g., through message stream processor 111 and path 128).

Pool 130 of servers 131 and databases 135 may include hardware, software, or a combination thereof, to implement logic configured to execute instructions to process requests and access data from distributed processors and/or memory devices to fulfill requests generated by computing devices 104a to 104n. For example, databases 135 may include data representing property listing information including, but not limited to, the type of property (e.g., a condo or single-family house), a location, a type of geographic region or topography (e.g., whether a rental property is in a forest, in an arid climate, in a mountainous region, etc.), a number of bedrooms, a number of bathrooms, a cost per unit time (such as per day or per week), a listing of available amenities (e.g., number and types of towels, kitchen utensils, toiletries, etc.), available images of the property rental and its environs, a set of reviews regarding the property listing by past guests, and the like. In some examples, logic in pool 130 may be configured to generate message 133 (e.g., a fetch message) via path 128 to fetch messages from message stream processor 111 for consumption and subsequent processing, as well as presentation via network 106 to one of computing devices 104a to 104n (e.g., message 133 can cause other data messages to be transmitted from system 110 to the computing device from which a call originates).

Further to diagram 100, message stream processor 111 is shown to include any number of server computing devices 112a to 112n, one or more of which may be coupled together via communication paths, such as networks 114a and 114b. Server computing devices 112a to 112n may be configured to include memory for storing data structures 118 in which messages may be stored in a determinable arrangement or relationship (e.g., a sequential order, such as message ID 0, message ID 1, message ID 2, . . . , message ID 'm−1,' and message ID 'm'), whereby later-received messages (e.g., message ID 'm+1') can be appended to data structure 118 consistent with the aforementioned order. According to some embodiments, message stream processor 111 may be configured to classify subsets of messages received from path 108 to form classified subsets of messages. In at least one embodiment, message stream processor 111 may be configured to stream message data of a certain classification to a corresponding data structure 118. In particular, a data structure, such as data structure 118, may be associated with specific message type or classification. One or more data structures 118 may be configured to receive streams of message data classified as, for example, "calls to perform search queries" on a property listing, or any other type of message. Note that a call can include event data or other types of data. According to some embodiments, each data structure 118 may be implemented as an independently-accessible partition of memory.

Stream controller 116 may include hardware, software, or a combination thereof, to implement logic configured to control the process of appending messages to corresponding data structures and to facilitate fetch operations for streaming one or more subsets of message data from a given data structure 118 to a server process (e.g., associated with one of servers 131) configured to consume the one or more subsets of message data. In some embodiments, stream controller 116 may be configured to manage the "publication" of messages from producing processes to "subscribers" of messages that consume the message data therein. As such, stream controller 116, or any other structure and/or function of message stream processor 111 or distributed computing system 110, may be configured to implement a publish-subscribe model of messaging.

According to some examples, message stream processor 111 may be configured to provide a data throughput of, for instance, 30 to 190 MB/sec, or greater, and further configured to provide a throughput of 200,000 to 500,000 messages per second, or greater (e.g., with a message size of 50 to 200 bytes or greater). Further, message stream processor 111 may be configured to provide reduced or negligible latencies (e.g., end-to-end, point-to-point, etc.) of less than 15 milliseconds, such as, for example, an average latency of 2 to 3 milliseconds, or less. Accordingly, large quantities of data and message data may stream rapidly via path 128.

Data stream processor 160 is configured to access the streams of data at a portion of path 128 to, for example, identify one or more stream characteristics from one or more streams of data originating from a classified subset(s) of messages. Note further that the structures and/or functions of message stream processor 111 (or a portion thereof) can provide for, or be modeled as, an ultra-high throughput pipe 140 for communicating a multitude of data streams, such as data streams represented as data stream ("A") 120, data stream ("B") 122, and data stream ("C") 124. Therefore, data stream processor 160 may be configured to access data streams 120, 122, and 124 in real-time (i.e. near real-time) to identify stream characteristics with which to determine whether a data stream may be associated with non-anomalous or anomalous operation.

As shown in diagram 100, data stream processor 160 may include a data stream anomaly manager 162 that may be configured to detect an anomaly associated with at least one data stream of a number of data streams transiting ultra-high throughput data pipe 140. In particular, data stream anomaly manager 162 is configured to detect whether an anomaly exists for data streaming between, for example, computing devices 104a to 104n and a point within distributed computing system 110, such as point 129, adjacent to or at pool 130 of servers 131 and databases 135.

Data stream anomaly manager 162 may be configured to determine a state of a data stream based on a stream characteristic associated with, or otherwise detected in, data streams 120, 122, and 124 via path 128. A state or condition of a data stream may be described as anomalous or non-anomalous, which may include various sub-states or levels that represent various degrees of deviation from a relatively normal or expected state. In particular, data stream anomaly manager 162 may compare a value associated with an identified stream characteristic against data representing, for example, a threshold to determine whether the value exceeds the threshold. As such, one or more identified stream characteristics can be used to describe whether the data stream (e.g., associated with a specific computing device 104 in a group of computing devices 104a to 104n). According to some examples, data stream anomaly manager 162 can be configured to determine a detected value or derive a value to form a derived value (e.g., a value derived by aggregating or performing mathematical operations based on a detected or measured value, etc.).

Consider the following example to illustrate an implementation of data stream anomaly manager 162, according to some examples. Data stream processor 160 may be configured to access data in data streams 120, 122, and 124 to identify at least one stream characteristic. In this example, a stream characteristic may specify a value for a detected parameter ("P2") 121, such as a response time, relative to another parameter ("P1") 123, such as a point in time at which a magnitude of the response time occurs. In some cases, a response time may be measured from a first point in time at which a call, a request, or a command is received into distributed computing system 110 (e.g., at point 109) and to a second point in time at which a corresponding resultant response is transmitted back to a requesting computing device 104. Further to the example shown, magnitudes or values 190a, 190b, and 190c depict response time values relative to points in time for data streams 120, 122, and 124, respectively.

Data stream anomaly manager 162 may be further configured to monitor whether a value of a response time, such as one of values 190a, exceed the threshold such as threshold ("2 sigma") 192 or threshold 194 ("1 sigma") relative to a reference value ("x") 196. In this case, reference value 196 may describe an average or expected value (e.g., a moving average, etc.) associated with non-anomalous behavior, including normal response time values. Threshold 192 and threshold 194 may be set as a second standard deviation and a first standard deviation, respectively, relative to reference value 196. As shown, data stream 124 includes one or more values 190c that exceed threshold 192, whereby data stream anomaly manager 162 can detect anomaly 125. Thus, data stream 124 may be described as being in an anomalous state for at least the duration of time shown.

A service level agreement (e.g., an SLA) or a general rule may be used to set one or more threshold values 192 and 194 at which data stream anomaly manager 162 detects an anomalous stream characteristic for flows of data associated with one or more subsets of messages (e.g., subsets of messages from one or more computing devices 104a to 104n). Further, data stream anomaly manager 162 can generate anomaly resolution data configured to counteract (e.g., either automatically or manually) effects of the detected anomaly associated with a data stream. In one example, data stream anomaly manager 162 can generate data to cause the identified stream characteristic associated with anomalous data stream to transition from an anomalous value to a non-anomalous value (e.g., within a range of values associated with normal expected operating parameters). In another example, data stream anomaly manager 162 can generate alert data to alert an entity, such as a user or another computing device, to an occurrence of anomaly 125 so that appropriate measures may be taken to address or otherwise resolve anomaly 125 at a present time or in the future.

Figure 2:
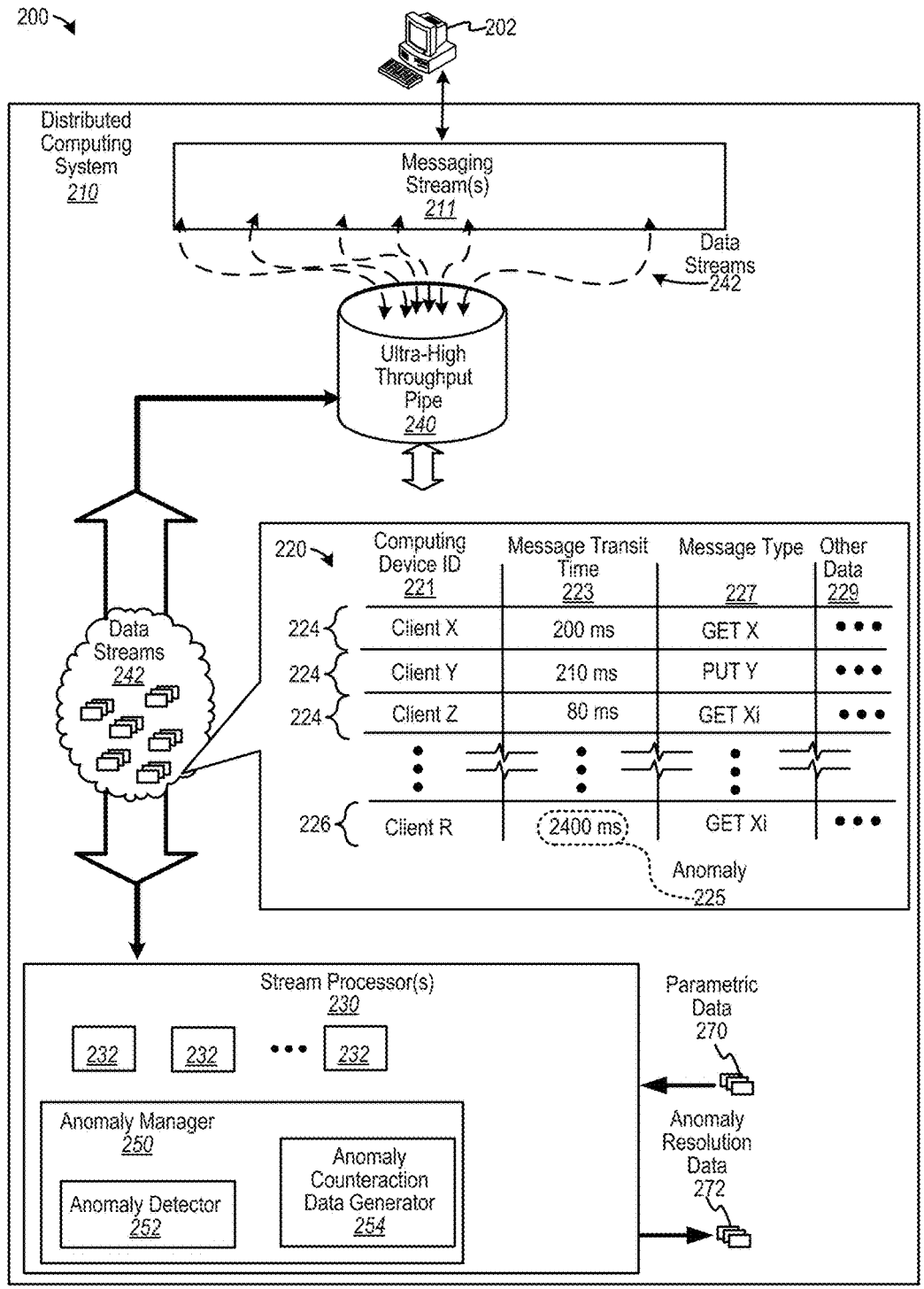
FIG. 2 is a diagram depicting an example of a logical representation of a distributed computing system implementing anomaly management, according to some examples.

In view of the foregoing, the structures and/or functionalities of distributed computing system 110 and its components, including message stream processor 111 and data stream processor 160, can access data (e.g., directly access data) representing, or associated with, a stream characteristic of a data stream (e.g., an unbounded transmission of messages that may be in transit). Thus, data need not be accessed from disk for purposes of identifying the stream characteristic. Based on the accessed data, one or more characteristics or attributes of a data stream may be correlated to the same data stream and/or against a pool of other data streams (collectively or individually) to determine whether a particular data stream is anomalous, or at least includes anomaly 125 that exceeds a value, or a range of values, that defines a threshold. In accordance with various embodiments, data stream processor 160 and/or data stream anomaly manager 162 may be configured to access data representing a stream characteristic in real-time, or substantially in real-time. According to some embodiments, a data stream is in an unbounded sequence of messages or units of data (e.g., expressed in any format, including tuples) as the data for the messages or the units of data transit or otherwise are communicated from one point to another point within distributed computing system 110. According to some embodiments, the term "real-time" may refer to an amount of time sufficient to perform a method (e.g., execute instructions) for accomplishing an operation, such as accessing a data stream for a call originating from a certain computer and determining whether a detected or derived value associated with the data stream exceeds a threshold based on the accessed data. In some cases, requests for such data need not be necessary, and, as such, the data need not be retrieved from disk. In some examples, the term real-time can describe the implementation of data stream anomaly manager 162 "in-memory," such as in RAM or other like memory. The term real-time or substantially in real-time may refer to data, such as stream characteristic data, that may be accessed from a data stream and processed as the data in the data stream transits between a first computing device (e.g., a device that persists a classified subset of messages) and a second computing device configured to consume the data stream. According to some implementations, the term real-time may refer to an amount of time between a point in time at which a threshold excursion (e.g., an anomaly) is detected and another point in time when data stream anomaly manager 162 can generate anomaly resolution data responsive to the anomaly. In some cases, the term real-time may refer to a point in time or a time interval predominantly constituting a latency (e.g., a time interval predominantly due to latency). An average latency may be between 1.5 and 2.5 milliseconds, which may be the amount of time an anomaly is at least detected, and optionally resolved, in real-time. Or, the detection and resolution may be performed, for example, in 3 milliseconds or less. Therefore, an anomaly associated with a subset of message data may be detected in real-time as subsets of message data streams by, or adjacent to, data stream processor 160. Thus, data stream processor 160 can facilitate reduction or elimination of anomalous requests and message data generated by, for example, "bugs" in code that might generate numerous calls from a computing device (e.g., caused by an infinite loop of calls), or by ill-intentioned or negligent parties (e.g., unusual or abnormal quantities of data requests to computing resources within distributed computing system 110). Accordingly, data stream processor 160 can reduce or eliminate inadvertent causes of delays in FIG. 2 is a diagram depicting an example of a logical representation of a distributed computing system implementing anomaly management, according to some examples. Diagram 200 depicts a distributed computing system 210 configured to detect anomalies, and further configured to alert and/or resolve such anomalies in a data stream between a computing device 202 and distributed computing system 210. Note that elements depicted in diagram 200 of FIG. 2 may include structures and/or functions as similarly-named or similarly-numbered elements depicted in other drawings. Distributed computing system 210 is shown to include messaging streams 211, an ultra-high throughput pipe 240, and stream processor(s) 230. In some implementations, messaging streams 211 may include a number of data arrangements into which messages stream. Further, messaging streams 211, as well as other elements of distributed computing system 210, may operate to provide relatively high throughput for transmitting messages that can be represented as ultra-high throughput pipe 240.

Stream processors 230 include one or more portions of hardware and/or software that are configured to implement real-time data processors 232. According to some embodiments, a real-time data processor 232 may be implemented as an anomaly manager 250. Note that anomaly manager 250 depicted in diagram 200 of FIG. 2 may include at least some structures and/or functions similar to, for example, data stream anomaly manager 162 of FIG. 1. Further to FIG. 2, anomaly manager 250 may include an anomaly detector 252 and an anomaly counteraction data generator 254. Anomaly detector 252 may be configured to detect one or more characteristics of a data stream in a group of data streams 242, in real-time or substantially in real-time, and to determine whether any of the one or more characteristics is associated with a value that may be anomalous relative to a threshold value or threshold range. For example, a threshold value may be set to enforce a rule or limit that a response time for distributed computing system 210 to provide a response that may not exceed 500 milliseconds.

Consider the following to illustrate an example of anomaly manager 250 and its components. A number of requests generated by multiple computing devices 202 may be received into distributed computing system 210, which, in turn, may generate a number of data streams 242. Anomaly manager 250 is configured to access data streams 242 to identify stream characteristics and associated values, some of which are depicted as data 220. Each data stream of data streams 242 may be accessed to identify one or more stream characteristics for a corresponding data stream. As shown, different data streams may be associated with different data arrangements 224 and 226 that may include subsets of data representing one or more stream characteristics. Examples of stream characteristics include computing device identifiers ("ID") 221 (e.g., an IP address or any other type of data that identifies a computing device or user), a message transit time 223 (e.g., a response time), a message type 227, and/or any other stream characteristic data 229.

Anomaly detector 252 may be configured to determine whether values of stream characteristics shown as part of data 220 are normal or otherwise anomalous. Threshold data may include data representing a threshold against which to compare values of the stream characteristic to determine whether a stream characteristic is associated with an anomaly. In the example shown, parametric data 270 may include threshold data representing a threshold over which a stream characteristic and/or data stream may be considered an anomaly. Consider that parametric data 270 may include data representing a threshold of 500 milliseconds against which message transit time 223 may be compared to determine whether a detected transit time is deemed anomalous. In this case, anomaly detector 252 may compare values of stream characteristics 223 for data streams 224, and further determine that the values of 200 ms, 210 ms, and 80 ms do not surpass the threshold value. As such, data streams 224 may be viewed as non-anomalous. By contrast, anomaly detector 252 may compare a value of stream characteristic 223 for data stream 226 to detect that a value 2400 ms exceeds the threshold amount of 500 ms. Note that the value of threshold data can be of any value is not limited to 500 ms (e.g., the value of threshold data may be in a range of 150 ms to 300 ms, etc.). Accordingly, an anomaly detector 252 identifies a value for stream characteristic 223 that is an anomaly 225. In some cases, a message transit time may refer to a response time, which may be an amount of time that distributed computing system 210 consumes to generate a response. A response time may also include an amount of time for a request sent from computing device 202 to be received by distributed computing 210. As an example, a response time may describe an amount of time between a request entering an interface (e.g., an applications programming interface, or API) and/or exits the interface to provide response to the request. Also, a response time may also include one or more intervals of time during which data transits in either one or two directions between computing device 210 and distributed computing system 210.

Further to the example described above in view of data 220, anomaly manager 250 can access computing device IDs, as stream characteristic 221, in real-time or in substantially real-time. Anomaly detector 252 may further determine that a computing device ID, such as "Client R," is not authorized to access distributed computing system 210, whereby anomaly detector 252 may operate to classify a data stream based on "Client R" as anomalous. Similarly, anomaly detector 252 may determine whether a particular message type is anomalous or non-anomalous based on parametric data and/or as a function of other stream characteristics, such as message types. Examples of message types include GET, POST, PUT, DELETE, and other HTTP methods (e.g., for RESTful API services), or message types for any other any other messaging protocol, process, technique or system.

Anomaly counteraction data generator 254 may be configured to determine a course of action to be taken (e.g., represented by action data) responsive to the detection of an anomaly, and may be further configured to generate anomaly resolution data 272. In some examples, anomaly resolution data 272 may include alert data that is formatted in a configuration to cause generation of an electronic message to a destination (e.g., a user's phone). Additionally, anomaly counteraction data generator 254 may be configured to determine a course of action to be taken to resolve an anomaly (e.g., at present or in the future) responsive to the detection of the anomaly. Thus, counteraction data generator 254 may generate anomaly resolution data 272 that include corrective action data that is configured to cause a processor executing instructions to perform one or more corrective actions to resolve the anomaly and to adjust a value of a stream characteristic to conform an anomalous data stream 226 to expected or normal values of operation. According to some examples, anomaly resolution data 272 may be determined and generated in real-time (or substantially in real-time) responsive to the detection of an anomaly by anomaly manager 250, which may also operate anomaly detector 252 to detect an anomaly in real-time (or substantially in real-time). According to some examples, anomaly resolution data 272 may be transmitted to any element in distributed computing system 210, such as an electronic message-paging application or other elements therein, or to an element external to distributed computing system 210 that may be configured to resolve or take action to resolve anomaly, regardless of whether anomaly resolution is manual or automatic.

Figure 3A:
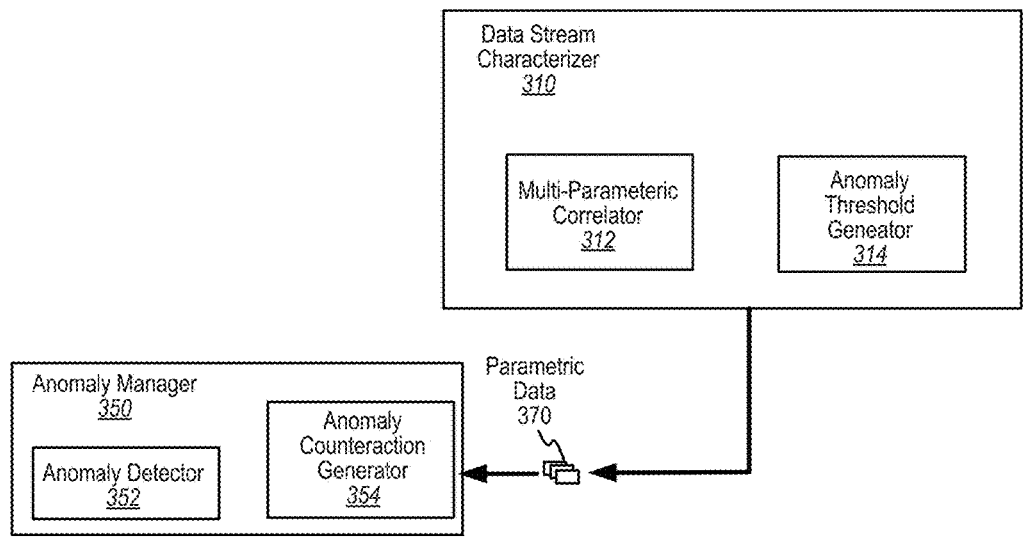
FIGS. 3A and 3B depict examples of the types of data consumed or produced by an anomaly manager, according to some examples.
Figure 3B:
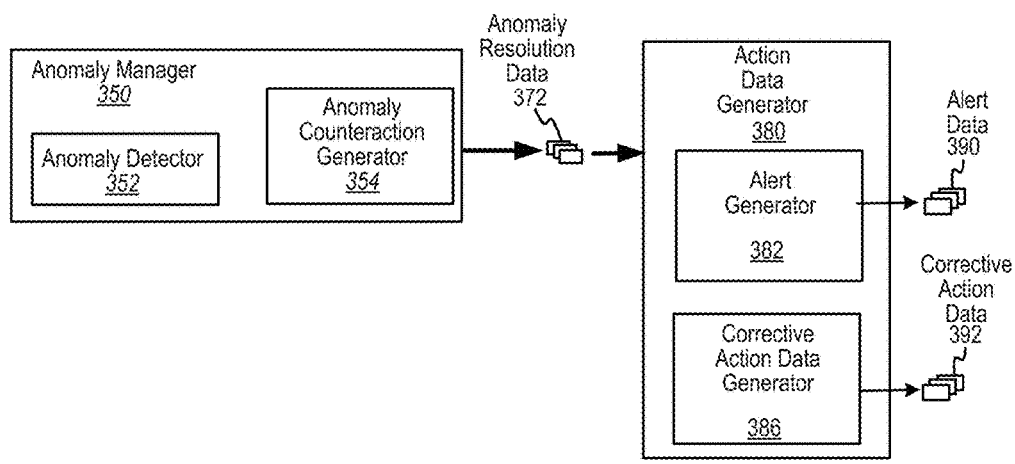

FIGS. 3A and 3B depict examples of the types of data consumed or produced by an anomaly manager, according to some examples. FIG. 3A includes a diagram 300 depicting a data stream characterizer 310 configured to generate parametric data 370, which, in turn, may be provided to an anomaly manager 350. As shown in diagram 300, anomaly manager 350 includes an anomaly detector 352 and an anomaly counteraction generator 354. Note that elements depicted in diagrams of FIGS. 3A and 3B may include structures and/or functions as similarly-named or similarly-numbered elements depicted in other drawings.

Data stream characterizer 310 may be configured to characterize stream characteristics from a number of data streams to determine (e.g., to "learn") parametric values for stream characteristics that are associated with normal or expected states or conditions of any number of data streams. The parametric values may be used for determining threshold values which may be static or dynamic. A static threshold value may refer to a parametric value or value of a stream characteristic that remains relatively consistent for a duration of time and is used as a threshold value for the duration of time. A dynamic threshold value may change based on one or more attributes of one or more data streams based upon a context in which a distributed computer system is operating. Thus, a threshold value may change dynamically as a function of other stream characteristics of a common data stream (e.g., a response time threshold may vary dynamically among different values based on different message types). Or, a threshold value may change as a function of a stream characteristic for one data stream relative to the same stream characteristic of other data streams (e.g., a response time for a specific data stream relative to response times for other data streams).

As shown, data stream characterizer 310 includes a multi-parametric correlator 312 and anomaly threshold generator 314. Data stream characterizer 310 may be configured to characterize any number of stream characteristics to monitor and store the values of the stream characteristics in an archival repository (not shown) that is configured to maintain historical data. In some embodiments, data stream characterizer 310 may be configured to characterize one or more identified stream characteristics from one or more data streams to identify parametric values. A subset of parametric values may include a set of characterize values of one stream characteristic, or a set of characterized value of multiple stream characteristics for one or more data streams. As an example, data stream characterizer 310 may characterize values to form parametric values for the following exemplary stream characteristics: response times, computer device identifiers ("IDs"), latencies, message types (e.g., predominant message types), request types, datatypes, etc. The parametric values of the stream characteristics can be characterized relative to time, and one value of a stream characteristic may be related to one or more other values of the same stream characteristic or other stream characteristics of the same data stream or other data streams.

Multi-parametric correlator 312 may be configured to correlate subsets of parametric values based on a value for an identified stream characteristic and values of other stream characteristics to form correlated parametric values. In some cases, multi-parametric correlator 312 may correlate parametric values of the stream characteristic, such as different response times over time for a specific data stream, to determine a first subset of parametric values that correlate to normal or expected operation and a second subset of parametric values that correlate to an anomalous operation or data stream. As such, multi-parametric correlator 312 may derive a first subset of response times from 0 to 200 ms for non-anomalous states of operation of the data stream and second subset of response times that exceed 200 ms for anomalous states of operation of the data stream. Thus, the two subsets may be used to "learn" whether a data stream is anomalous or non-anomalous based on whether a response time is between 0 and 200 ms or exceeds 200 ms.

In other cases, multi-parametric correlator 312 may correlate parametric values of a specific stream characteristic to a number of other parametric values of other stream characteristics. Based on the correlated parametric values, multi-parametric correlator 312 may be configured to classify a subset of correlated parametric values for the data stream as non-anomalous, such as a range of parametric values of one or more of computer identifiers, a transit time, and a message type as non-anomalous. As such, multi-parametric correlator 312 can identify patterns of parametric values over time, whereby the patterns define a demarcation between anomalous and non-anomalous states of data stream operation. According to some embodiments, multi-parametric correlator 312 may include hardware and/or software such that a processor may be configured to execute instructions in relation to a training computing device to perform machine learning to classify the subset of the correlated parametric values. The training computer device can implement known predictive analytics or modeling techniques and algorithms to statistically recognize patterns of the values of stream characteristics over time relative to other stream characteristics. As an example, Bayesian classification techniques and computer algorithms may be used to classify ranges of parametric values as either non-anomalous or anomalous.

Anomaly threshold generator 314 is configured to access data generated by multi-parametric correlator 312, whereby the data may describe various relationships or correlations among stream characteristics and corresponding parametric values. Further, anomaly threshold generator 314 may be configured to generate an anomaly threshold for a data stream based on subsets of the correlated parametric values (e.g., as determined by multi-parametric correlator 312) to detect the anomaly. For instance, anomaly threshold generator 314 may be configured to set anomaly-indicating thresholds for data streams based on parametric values for one or more of computer identifiers, transit times (e.g., response times), message types, and the like. The anomaly thresholds can be transmitted as parametric data 370 to anomaly manager 350 for purposes of detecting anomalies in real-time, or substantially in real-time.

FIG. 3B includes a diagram 301 depicting an action data generator 380 configured to generate action data, which may include alert data 370 and corrective action data 392, responsive to receiving anomaly resolution data 372 from anomaly manager 350. As shown in diagram 301, action data generator 380 may include an alert generator 382 and a corrective action data generator 386 for generating alert data 370 and corrective action data 392, respectively. Action data generator 380 may be configured to receive an indication that an anomaly is detected (as well as the type and/or severity of the detected anomaly) via anomaly resolution data 372, and may be further to form real-time alert data configured to notify an entity (e.g., an application having executable instructions for execution by a processor, or a user, such as an IT professional) of the anomaly. Real-time alert data may be for transmission via one or more electronic message types. In one example, real-time alert data 390 may be transmitted in a text message format (e.g., formatted for a short message service, or SMS, messaging service). In another example, real-time alert data 390 may be transmitted to an application that, for instance, generates SMS-based alerts, email-based alerts, automated phone calls, etc., to notify IT personnel of deficient performance of distributed computing systems and networks. An example of such an application is Pagerduty™ produced by Pagerduty, Inc., of San Francisco, Calif.

Corrective action data generator 386 may be configured to also receive an indication that an anomaly is detected, as well as the type and/or severity of the detected anomaly, via anomaly resolution data 372. Corrective action data generator 386 may be further configured to generate resolution data (e.g., real-time corrective action data 392), which, in turn, is configured to resolve anomaly at present or in the future. In some examples, corrective action data 392 may be configured to adjust a parametric value associated with a non-compliant state of a stream characteristic (i.e., a parametric value related to an anomaly), whereby an adjustment may induce or cause a parametric value to transition to a compliant state so that the stream characteristic becomes non-anomalous. An entity, such as a self-healing application or a user (e.g., an IT professional), may receive corrective action data 392 and, in response, may initiate corrective actions to resolve the occurrence of the anomaly. For example, if response times "spike" to anomalous values, an application may be configured to automatically "heal" the anomalous condition by utilizing a computational component of a distributed computing system that is configured to alleviate or eliminate the detected anomaly.

Figure 4A:
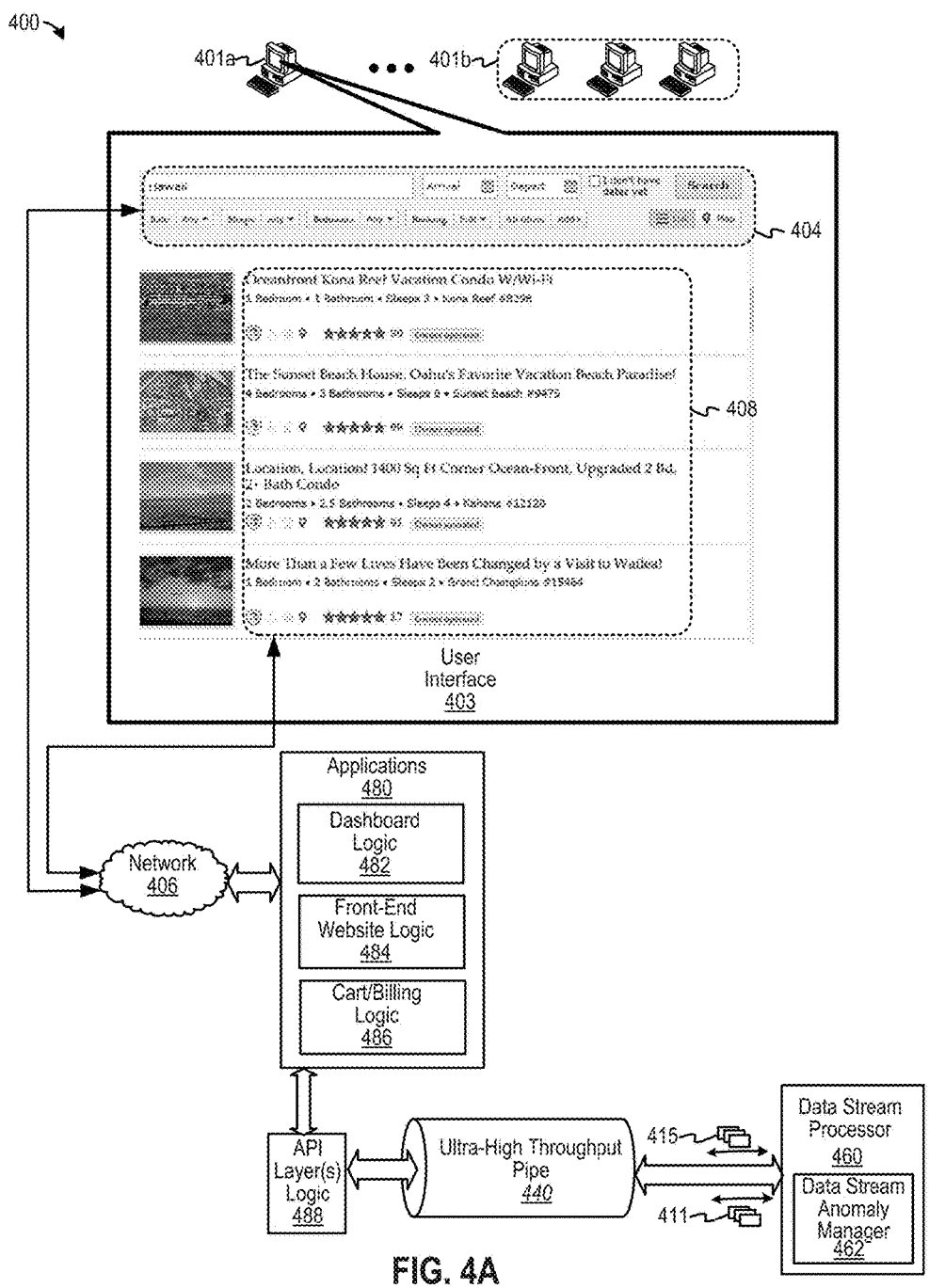
FIGS. 4A and 4B depicts types of data embodied in data streams for which anomalies may be managed, according to some embodiments.
Figure 4B:
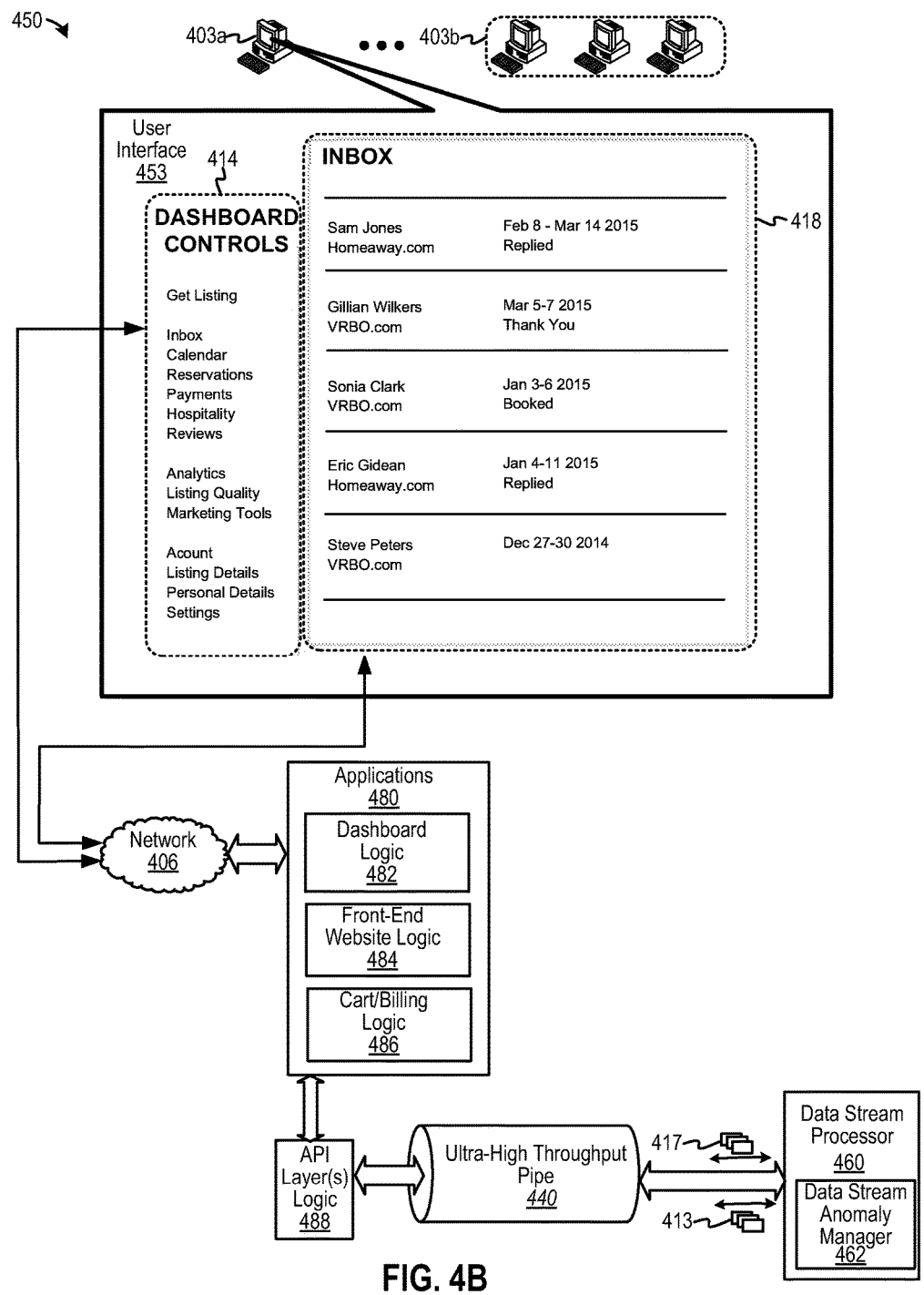

FIGS. 4A and 4B depicts types of data embodied in data streams for which anomalies may be managed, according to some embodiments. FIG. 4A is a diagram 400 depicting a data stream processor 460 and a corresponding data stream anomaly manager 462 that may be configured to detect and resolve anomalies in data streams 415 and 411 associated with requests from one or more computing devices 401. Diagram 400 also depicts data streams 415 and 411 communicating via an ultra-high throughput pipe 440 in association with a group of applications 480 in a distributed computing system, which also may include data stream processor 460. Applications 480 may include distributed applications (e.g., executable code) for facilitating computerized renting of temporary lodging, according to some embodiments. Applications 480 of diagram 400 are shown to include dashboard logic 482 for facilitating a dashboard/user interface with which to receive calls or requests from computing devices 401, front-end website logic 484 for facilitating rental inquiries, property listing searches, search results for filtered property listings, etc., and cart/billing logic 486 configured to facilitate payment for vacation property rentals. Applications 480 are not limited to those depicted and can include any type of logic for facilitating computerized vacation rentals. According to some examples, applications may be disposed in one layer and API layer logic 488 may be disposed in a lower layer (e.g., one layer below applications 480). API layers are configured to provide interfaces for the other applications as well as other processes in the distributed computing system.

To illustrate the types of data in data streams for which anomalies are monitored, consider that any number of computing devices, such as 401a and 401b, may generate calls or requests regarding renting of travel property. Diagram 400 depicts a user interface 403 of computing device 401 a that can facilitate the generation of requests via network 406 to the distributed computing system. A first portion 404 of user interface 403 is configured to receive user inputs for performing a query of rental property listings based on filtering criteria selected by a user. Data stream 411 may be generated responsive to data generated by portion 404 of user interface 403. An example of data stream 411 may include message data resulting from a "GET /listings" call. A second portion 408 of user interface 403 is configured to receive user inputs for reviewing search results and for further inquiring about specifics of a particular property. Data stream 415 may be generated responsive to inputs associated with portion 408 of user interface 403. Other data streams may be generated responsive to other interactions with other portions (not shown) of interface 403 during the search and renting of temporary lodging as a vacation rental.

FIG. 4B is a diagram 450 depicting a data stream processor 460 and a corresponding data stream anomaly manager 462 that may be configured to detect and resolve anomalies in other examples of data streams 417 and 413 associated with requests from one or more computing devices 403. Diagram 450 also depicts data streams 417 and 413 communicating via an ultra-high throughput pipe 440 in association with a group of applications 480 in a distributed computing system, which also may include data stream processor 460. Note that elements depicted in diagrams of FIG. 4B may include structures and/or functions as similarly-named or similarly-numbered elements depicted in FIG. 4A or other drawings.

To illustrate the types of data for which anomalies are monitored in data streams 417 and 411, consider that any number of computing devices, such as 403a and 403b, may generate calls or requests regarding renting of travel property. Diagram 450 depicts a user interface 453 of computing device 403a that can facilitate the generation of requests (e.g., for an owner managing rental of temporary lodging) via network 406 to the distributed computing system. A first portion 414 of user interface 453 is configured to receive user inputs for configuring and/or accessing various functional aspects of a dashboard that can be implemented as part of user interface 453. Data stream 417 may be generated responsive to data generated by portion 414 of user interface 453. An example of data stream 417 may include message data resulting from a "PUT /listings" call to edit one or more portions of a rental property listing webpage. A second portion 418 of user interface 453 may be configured to receive user inputs for facilitating access by an owner to electronic messages (e.g., in an inbox of a dashboard) for renting properties in communicating with potential traveler, among other things. Data stream 417 may be generated responsive to inputs associated with portion 418 of user interface 453. Other data streams may be generated responsive to other interactions with other portions (not shown) of interface 403 during the search and renting of temporary lodging as a vacation rental.

Figure 5:
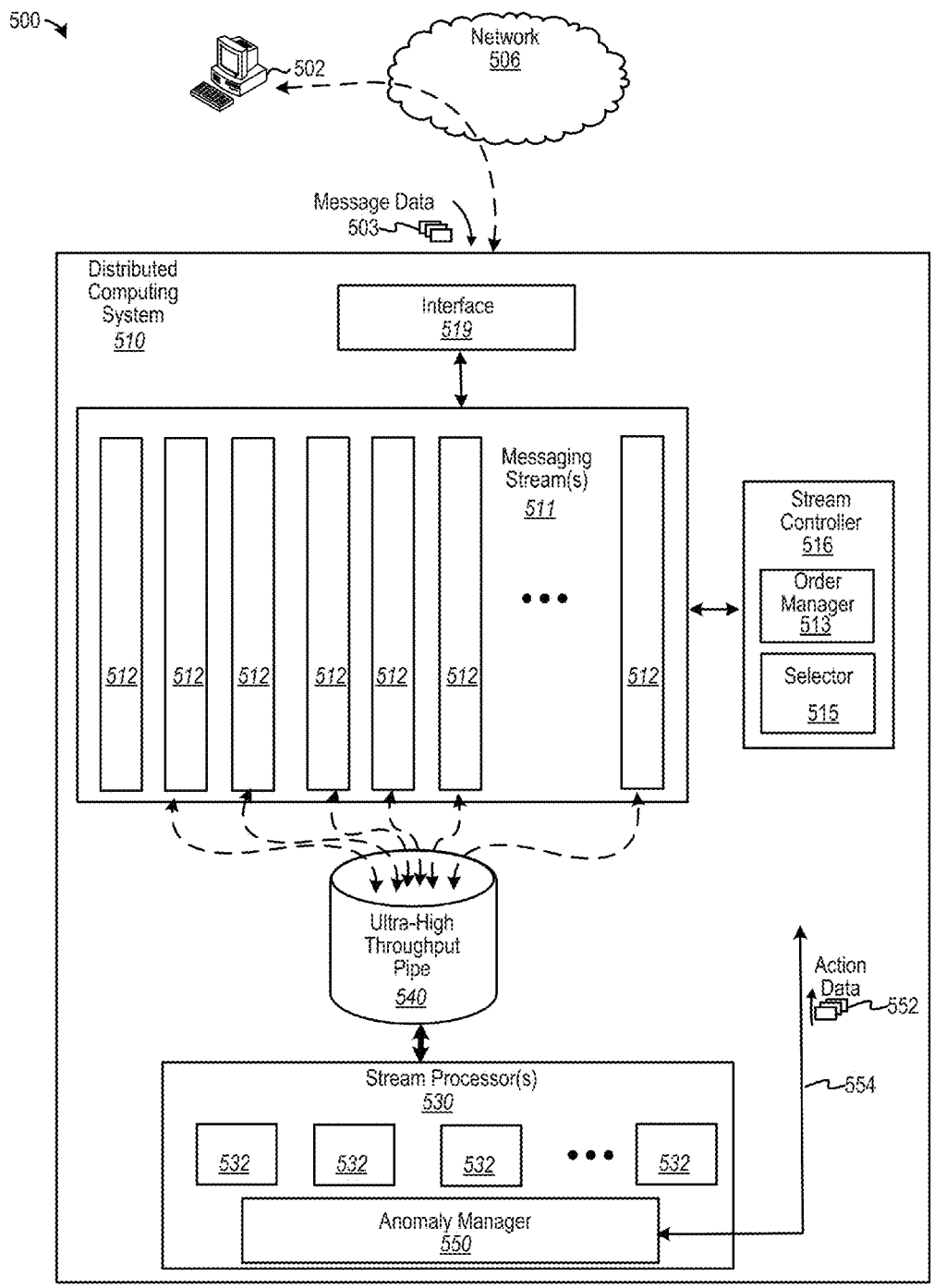
FIG. 5 is a diagram depicting another example of a logical representation of a distributed computing system implementing an anomaly manager, according to some examples.

FIG. 5 is a diagram depicting another example of a logical representation of a distributed computing system implementing an anomaly manager, according to some examples. Diagram 500 depicts a distributed computing system 510 configured to detect anomalies, and further configured to alert and/or resolve such anomalies in a data stream associated with distributed computing system 510. Note that elements depicted in diagram 500 of FIG. 5 may include structures and/or functions as similarly-named or similarly-numbered elements depicted in other drawings. Distributed computing system 510 may be configured to receive calls via network 506 from computing device 502, and is shown to include messaging streams 511, an ultra-high throughput pipe 540, and stream processor(s) 530. In some implementations, messaging streams 511 may include a number of data arrangements into which messages stream. According to some examples, the data arrangements may be partitions of memories formed as logical logs, which may be implemented as, for example, a set of segment files that may or may not be approximately the same size (e.g., 1 GB or greater). Further, one or more data arrangements may be configured as partitions, each of which may receive messages of a specific type of message, classification, or "topic." In some cases, the topic may be a category or an attribute of messages for a specific data feed. According to some embodiments, messaging streams 511, as well as other elements of distributed computing system 510, may operate to provide relatively high throughput for transmitting messages that can be represented as ultra-high throughput pipe 540.

Interface 519 may can be configured as one or more application programming interfaces, or APIs, so as to direct certain messages (e.g., via classification of such messages) to a corresponding data arrangement 512. Interface 519 may also be configured to encode messages (e.g., via the configurable method of serialization) for transmission or "publication" to a corresponding data arrangement 512.

Stream controller 516 is configured to control messages entering and exiting messaging streams 511 as shown, stream controller 516 may include an order manager 513 and a selector 515. Order manager 513 is configured to append incoming messages of a specific classification to a corresponding data arrangement 512 or log in some cases, order manager 513 may also be configured to assign a sequential ID number to each message whereby the sequential ID numbers provide for an order. According to some examples, the sequential ID number may be referenced as an "offset." Selector 515 is configured to fetch subsets of message data from data arrangements 512 based on a sequential ID number, and may be further configured to transmit message data to one or more computing devices and/or processes that are consumers of the data. According to some embodiments, selector 515 may be configured to stream message data via another applications programming interface, or API, to the one or more consuming computing devices. According to some embodiments, order manager 513 and selector 515 may be implemented in hardware, software, or a combination thereof.

Stream processors 530 include one or more portions of hardware and/or software that are configured to implement real-time data processors 532. According to some embodiments, a real-time data processor 532 may be implemented as an anomaly manager 550. Note that anomaly manager 550 depicted in diagram 500 of FIG. 5 may include structures and/or functions similar to, for example anomaly manager 162 of FIG. 1, or some other figures, to detect anomalies in data streams in real-time. Anomaly manager 550 may be configured to detect one or more characteristics of a data stream in real-time or substantially in real-time, and to determine whether any of the one or more characteristics is associated with a non-conforming value relative to a threshold value or threshold range. For example, a threshold value may be set to enforce a rule or limit that a response time for transmitting data (e.g., property listing search results) may not exceed a threshold number of milliseconds (e.g., 200 ms). Consider that 200 milliseconds is a threshold value for determining whether a response time is non-anomalous. Thus, a response time of 250 milliseconds may be considered a non-conforming value. As such, anomaly manager 550 may generate action data 552, responsive to detecting the non-conforming value (e.g., an anomaly), whereby action data 552 may include an executable instruction to identify a particular anomaly associated with a data stream including a subset of messages (e.g., associated with a specific computing device), as well as data representing data configured to invoke executable instructions (e.g., an application) to resolve or minimize the anomaly and/or generate data representing a real-time alert that an anomaly has been detected in real-time or near real-time. According to some examples, action data 552 may be transmitted via path 554 to any element in distributed computing system 510, such as messaging streams 511 or other elements therein (e.g., a computing device configured to generate and transmit anomaly notifications or a computing device configured to coordinate one or more processes within a distributed computing system to resolve a subset of anomalies).

Figure 6:
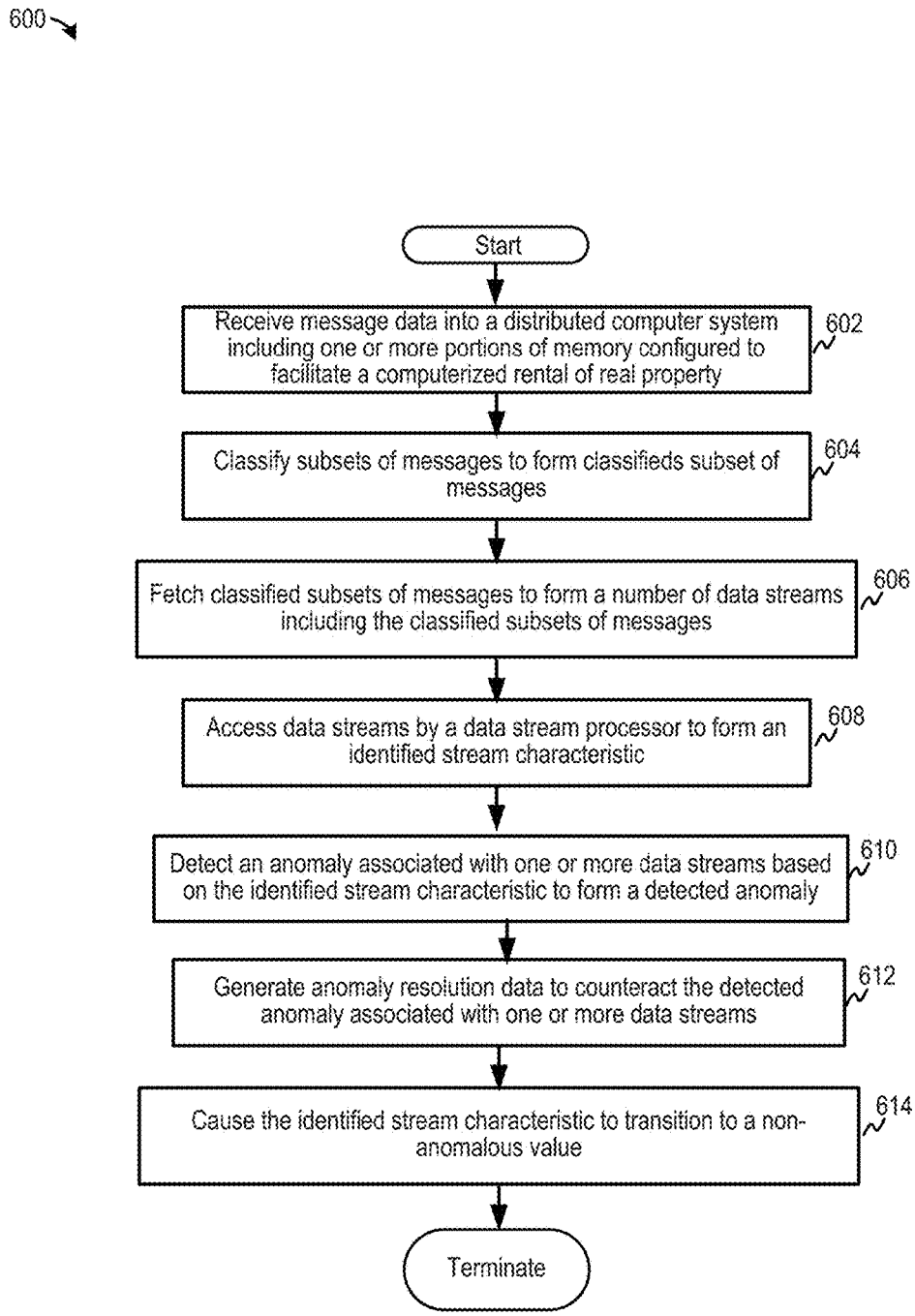
FIG. 6 is an example of a flow diagram to manage anomalies in data streams transiting a distributed computing system, according to some embodiments.

FIG. 6 is an example of a flow diagram to manage anomalies in data streams transiting a distributed computing system, according to some embodiments. At 602, flow 600 begins when message data is received into a distributed computer system that includes one or more portions of memory configured to facilitate a computerized rental of real property. The message data may include calls or requests, such as of the form "PUT X" and "GET Y," or the like, and may further include data representing an event. At 604, at least one subset of messages may be classified to form a classified subset of messages. In some examples, the classification can indicate a type of message, such as a search query message, or a type of event. At 606, the classified subsets of messages may be fetched to form a number of data streams that include the classified subsets of messages. At 608, a data stream processor associated with processing the classified subset of messages may access data streams to identify stream characteristics, whereby one or more identified stream characteristics may be used to detect an anomaly in one or more data streams at 610. At 612, a data stream processor may generate anomaly resolution data to counteract the detected anomaly associated with one or more data streams, and at 614 an identified stream characteristic associated with an anomaly may have its value transitioned (e.g., responsive to corrective actions) to a non-anomalous value.

Figure 7:
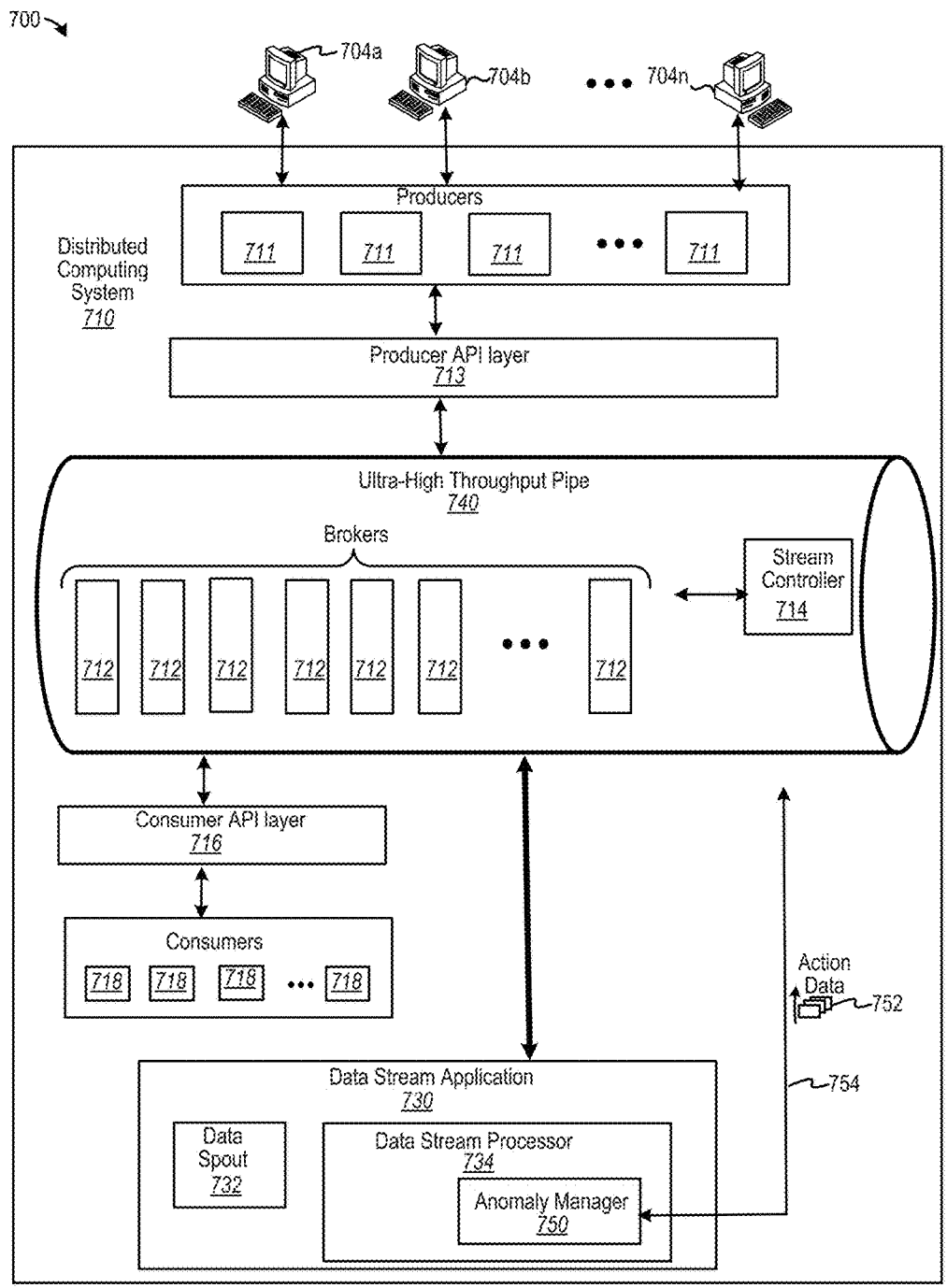
FIG. 7 depicts an example of a framework for detecting and resolving anomalies in a distributed computing system, according to some examples.

FIG. 7 depicts an example of a framework for detecting and resolving anomalies in a distributed computing system, according to some examples. Diagram 700 depicts any number of computing devices 704a to 704n in electronic communication with distributed computing system 710. As shown, distributed computing system 710 includes a number of producer processes ("producers") 711 coupled to a producer application programming interface ("API") layer 713, which may include one or more producer APIs. Further, distributed computing system 710 includes an ultra-high throughput pipe 740 coupled to a consumer application programming interface ("API") layer 716, which, in turn, is coupled to a number of consumer processes ("consumers") 718.

Producers 711 may be implemented in hardware (e.g., processors and memory), software, or a combination thereof, and may be configured to receive calls from one or more computing devices 704a to 704n. Further, producers 711 may be configured to transmit message data via producer APIs 713 to ultra-high throughput pipe 740. According to some examples, producer APIs 713 may be configured to retrieve a list of data arrangements or partitions to which records or message data may be transmitted (e.g., published).

As shown, ultra-high throughput pipe 740 is shown to include a number of brokers 712 and a stream controller 714, which may include structures and/or functions as similarly-named or similarly-numbered elements depicted in other drawings. According to some examples, brokers 712 each can represent a server process and/or server computing device configured to include log files associated with a partition "topic." Stream controller 714 may be configured to control or otherwise guide published messages transmitted from producers 711 via producer APIs 713 to a corresponding broker 712, at which incoming messages are appended to a logical log file. Stream controller 714 may also address messages in a log file by a logical offset relative to sequential message IDs, according to some examples. Note that in some implementations, messages may persist in brokers 712, absent a database schema and/or application (which may be used but is not necessary).

Consumers 718 may be implemented in hardware (e.g., processors and memory), software, or a combination thereof, and may be configured to receive or subscribe to one or more brokers 712. Further, consumers 718 may be configured to transmit fetch data messages via consumer APIs 716 to ultra-high throughput pipe 740. According to some examples, consumer APIs 713 may be configured to retrieve a list of message IDs and/or offsets with which to access the data arrangements or partitions (e.g., for a certain topic) from which records or data may be received (e.g., via subscription).

According to at least some embodiments, the above-described elements of distributed computing system 710 may be implemented in accordance with an architecture and/or framework implemented similar to, or consistent with, an Apache® Kafka™ messaging system, an example of which is maintained by the Apache Software Foundation, at www(.)apache(.)org. Stream controller 714 may be implemented, at least in some examples, as a service implementing Apache ZooKeeper™, an example of which may be maintained by the Apache Software Foundation. As such, brokers 712 may be configured to receive messages classified in accordance with Kafka-based "topics," according to some examples.

Distributed computing system 710 of diagram 700 further includes a data stream application 730 that may be configured to provide data stream processing, and further may be configured to include a data spout 732 and a data stream processor 734, according to some examples. An example of a data spout 732 may be implemented as hardware, software, or a combination thereof, that may be configured to retrieve data from broker 712 and generate specific data streams that are configured for real-time data processing. In some examples, data spout 732 can generate data streams formatted as tuples. According to some embodiments, data spout 732 may be configured or adapted to operate as a consumer 718.

Data stream processor 734 may be configured to access data streams produced by data spout 732, and may be further configured to perform processing on one or more input data streams. For example, data stream processor 734 may include logic to implement anomaly manager 750 as a function (e.g., a counting function, such as to determine a number of seconds or portions thereof (for calculating response times), increment and/or decrement functions, as well as other functions). Therefore, logic in anomaly manager 750 may be used to determine whether an amount of time in which a response to a call from a specific computer (relative to any other stream characteristic) exceeds a threshold amount based on data accessed in real-time. Thus, anomaly manager 750 may be configured to detect anomalous data streams and may initiate resolution of the anomaly as determined in real-time or substantially in real-time.

According to at least some embodiments, the above-described elements of data stream application 730 of distributed computing system 710 may be implemented in accordance with an architecture and/or framework similar to, or consistent with, an Apache® Storm™ messaging system, an example of which is maintained by the Apache Software Foundation, at www(.)apache(.)org. As such, data spout 732 may be implemented, at least in some examples, as an Apache Storm Spout™ and data stream processor 734 may be implemented, at least in some examples, as an Apache Storm Bolt™, whereby examples of specifications for implementing both Spout and Bolt are maintained by the Apache Software Foundation.

Anomaly manager 750 may generate action data 752, responsive to detecting a non-conforming value (e.g., a non-compliant data stream having an anomalous response time), whereby action data 752 may include an executable instruction to cause a computing device (e.g., implementing a producer 711) to generate an alert (e.g., via electronic messaging) or to perform an action to reduce or negate the effects of an anomalous data stream. According to some examples, action data 752 may be transmitted via path 754 to any element within or without distributed computing system 710, such as messaging streams 711, other elements therein, such as computing devices (e.g., servers), or other elements external to distributing computing system 710. In some examples, path 754 may be implemented using RabbitMQ™ messaging developed by Pivotal Software, Inc. of Palo Alto, Calif., U.S.A, or any other message broker software application.

Note that elements depicted in diagram 700 of FIG. 7 may include structures and/or functions as similarly-named or similarly-numbered elements depicted in other drawings.

Figure 8:
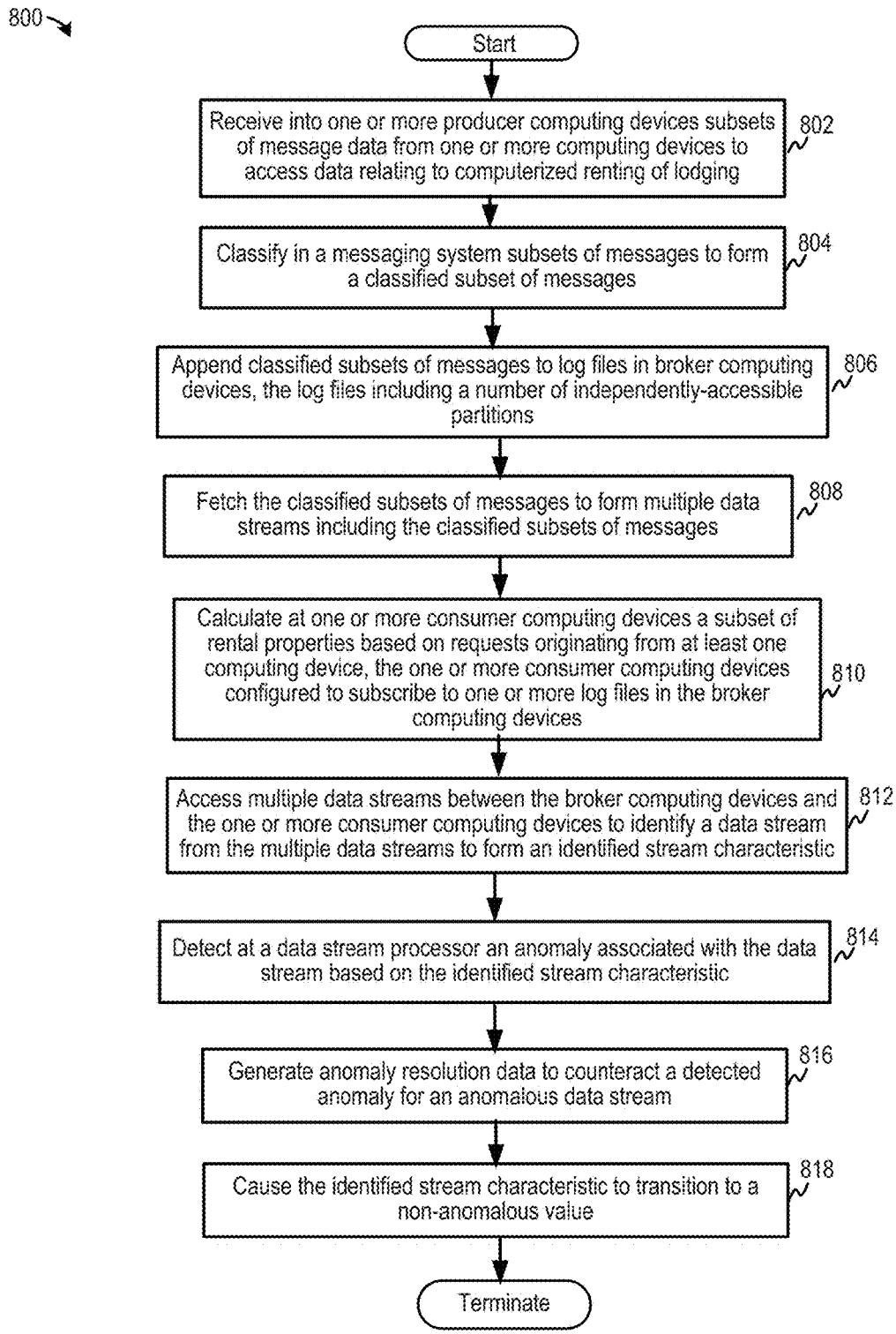
FIG. 8 is another example of a flow diagram to manage anomalies in data streams transiting a distributed computing system, according to some embodiments.

FIG. 8 is another example of a flow diagram to manage anomalies in data streams transiting a distributed computing system, according to some embodiments. At 802, flow 800 begins when one or more producer computing devices receive message data responsive to one or more calls originating from client computing devices. Producer computing device may include logic that is configured to support a producer processor and/or a producer API. For example, producer computing devices may generate messages to retrieve property listing data for purposes of generating formatted data to present to a user (e.g., a potential traveler) requesting information regarding vacation lodging. At 804, subsets of messages are classified to form classified subsets of messages. In some examples, the classification can indicate a type of message, such as a search query message, or a type of event. In a specific example, each classification may refer to a "topic" implemented as log files in accordance with Apache Kafka specifications or frameworks. At 806, the messages of the classified subsets of messages may be appended to the log files disposed in broker computing devices, whereby the log files may include a number of independently-accessible partitions. At 808, a consumer process or device and/or a consumer API may be configured to fetch messages from the classified subsets of messages in the form of a data stream, whereby the classification relates to, or defines, a topic. One or more consumer computing devices may be configured to subscribe to the log files in the broker computing devices (e.g., in accordance with a "publication-subscription" model), and may be further configured to calculate a subset of rental properties at 810 based on requests originating from at least one computing device. The one or more consumer computing devices may also serve or provide travel or vacation-related content from computing devices and memory (e.g., consumer computing devices) to the producer computing devices, which, in turn, may present the data (e.g., as a web page) to users of client computing devices.

At 812, multiple data streams between, for example, the broker computing devices and the one or more consumer computing devices may be accessed (e.g., in real-time) to identify a stream characteristic for one data stream in a group of multiple data streams to form an identified stream characteristic. In particular, at least one computing device can access a data stream (e.g., from a data spout, or a Storm Spout™) to identify the stream characteristic, whereby a data stream processor (e.g., a Storm Bolt) may analyze the state of a stream characteristic (e.g., a value of the stream characteristic) for purposes to determine whether a threshold value is exceeded. If so, an anomaly may be detected at 814. At 816, anomaly resolution data may be generated to counteract the detected anomaly and a corresponding anomalous data stream. At 818, a value of a stream characteristic (e.g., a value of response time) may be transitioned so as to comply with a threshold value (e.g., as a non-anomalous value).

Figure 9:
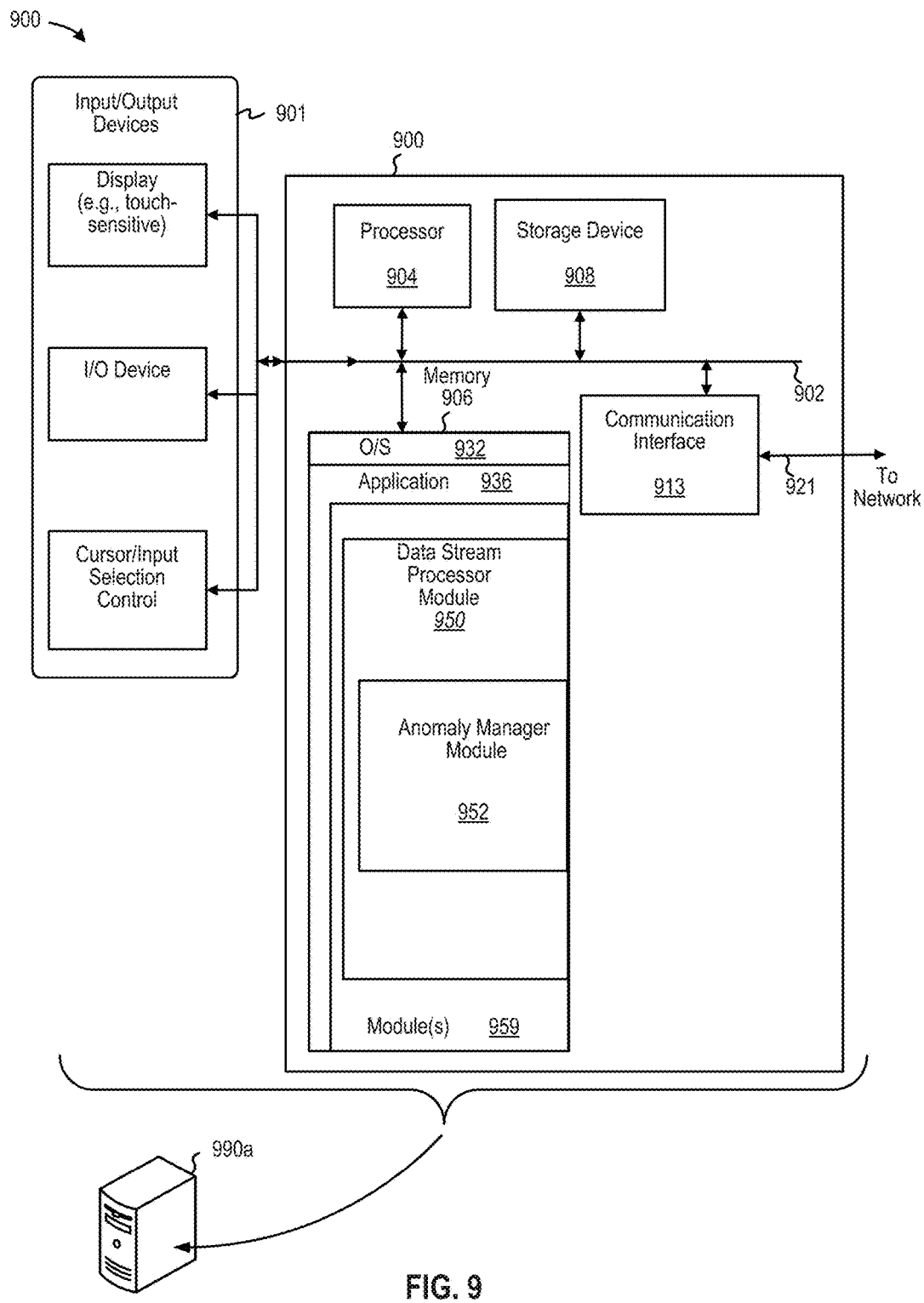
FIG. 9 illustrates an exemplary computing platform disposed in a computing system configured to establish a distributed computing system configured to detect anomalies in data streams in real-time or substantially in real-time, according to various embodiments.

FIG. 9 illustrates an exemplary computing platform disposed in a computing system configured to establish a distributed computing system configured to detect anomalies in data streams in real-time or substantially in real-time, according to various embodiments. In some examples, computing platform 900 may be used to implement computer programs, applications, methods, processes, algorithms, or other software to perform the above-described techniques.

In some cases, computing platform 900 can be disposed in any device, such as a computing device 990a.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), a communication interface 913 (e.g., an Ethernet or wireless controller, a Bluetooth controller, NFC logic, etc.) to facilitate communications via a port on communication link 921 to communicate, for example, with a computing device, including mobile computing and/or communication devices with processors. Processor 904 can be implemented with one or more central processing units ("CPUs"), such as those manufactured by Intel® Corporation, or one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Blue Tooth®, NFC, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown, system memory 906 includes a data stream processor module 950, which includes an anomaly manager module 952, one or more portions of which can be configured to detect and optionally resolve or notify, in real-time or near real-time, anomalies in data streams in a distributed computing system by implementing one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, data stream processor module 950, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 959 and data stream processor module 950, or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a data stream processor module 950, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a data stream processor module 950, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A computer-implemented method comprising:
as performed by a computing system comprising one or more computer processors configured to execute specific instructions,
  receiving message data from a plurality of computing devices regarding rental of real property, wherein message data received from a first computing device of the plurality of computing devices represents a message associated with a programmatic call generated by a user interface portion of a plurality of user interface portions concurrently displayed on the first computing device;
  classifying the message data into classified subsets of messages, wherein a classified subset of messages of the classified subsets of messages is classified based at least partly on a user interface portion from which individual messages in the classified subset of messages are generated;
  generating a plurality of data streams, wherein a data stream of the plurality of data streams comprises messages from the classified subset of messages;
  identifying a stream characteristic of the data stream based at least partly on data associated with a message of the classified subset of messages;
  detecting an anomaly associated with the data stream based at least partly on parametric data associated with the classified subset of messages and the stream characteristic; and
  generating anomaly resolution data regarding the anomaly.

2. The computer-implemented method of claim 1, wherein identifying the stream characteristic is performed in real-time as data in the data stream transits between a first computing device storing the classified subsets of messages and a second computing device configured to consume data in the data stream.

3. The computer-implemented method of claim 1, further comprising accessing data representing the stream characteristic from the data stream.

4. The computer-implemented method of claim 1, further comprising:
  identifying a plurality of parametric values using (1) the stream characteristic and (2) a plurality of other stream characteristics;
  identifying a correlated subset of the plurality of parametric values based at least partly on the stream characteristic and the plurality of other stream characteristics;
  classifying the correlated subset of the plurality parametric values as non-anomalous; and
  generating an anomaly threshold for the data stream based at least partly on the correlated subset of the plurality of parametric values.

5. The computer-implemented method of claim 4, wherein identifying the plurality of parametric values comprises:
  characterizing one or more of: computer identifiers, a transit time, or a message type;
  classifying, as non-anomalous, parametric values of the one or more of: computer identifiers, the transit time, or the message type; and
  setting the anomaly threshold for the data stream based at least partly on the parametric values of the one or more of: computer identifiers, the transit time, or the message type.

6. The computer-implemented method of claim 4, further comprising:
  executing instructions on a training computing device to perform machine learning; and
  classifying the correlated subset of the plurality of parametric values based at least partly on the machine learning.

7. The computer-implemented method of claim 1, wherein generating the anomaly resolution data comprises generating action data comprising at least one of: alert data or corrective action data.

8. The computer-implemented method of claim 7, wherein generating the action data comprises:
  generating resolution data configured to cause the stream characteristic to transition to a non-anomalous value.

9. The computer-implemented method of claim 7, wherein generating the action data comprises:
  generating real-time alert data representing an indication that the anomaly is detected; and
  transmitting the real-time alert data in an electronic message including an SMS format.

10. The computer-implemented method of claim 1, further comprising adjusting a parametric value in a non-compliant state to transition to a compliant state.

11. The computer-implemented method of claim 1, further comprising transmitting, to the first computing device, a network resource comprising instructions for display of the plurality of user interface portions.

12. The computer-implemented method of claim 1, wherein the user interface portion comprises a predefined display region of a user interface, the predefined display region comprising a plurality of interactive elements configured to generate programmatic calls.

13. A system comprising:
  one or more producer computing devices, wherein a producer computing device of the one or more producer computing devices is configured to receive message data from one or more computing devices, wherein message data received from a first computing device of the one or more computing devices comprises a programmatic call relating to effecting rental of real property, generated by a user interface portion of a plurality of user interface portions concurrently displayed on the first computing device;
  a plurality of broker computing devices, wherein a broker computing device of the plurality of broker computing devices is configured to:
    classify at least a portion of the message data into a classified subset of messages based at least partly on a user interface portion from which individual messages in the classified subset of messages were generated; and
    append the classified subset of messages to a log file;
  one or more consumer computing devices, wherein a consumer computing device of the one or more consumer computing devices is configured to:
    subscribe to the log file; and
    determine, based at least partly on the message data, data regarding a subset of rental properties to be presented by a computing device; and one or more data-stream computing devices, wherein a data-stream computing device of the one or more data-stream computing devices is configured to:
- access a plurality of data streams between the plurality of broker computing devices and the one or more consumer computing devices;
- identify a data stream of the plurality of data streams;
- detect an anomaly associated with the data stream based at least partly on a stream characteristic of the data stream; and
- generate anomaly resolution data regarding the anomaly.

14. The system of claim 13, wherein the data-stream computing device is further configured to identify the stream characteristic in real-time as data in the data stream transits between a first computing device storing the classified subset of messages and a second computing device configured to consume data in the data stream.

15. The system of claim 13, wherein the data-stream computing device is further configured to:
- identify parametric values based at least partly on (1) the stream characteristic and (2) a plurality of other stream characteristics;
- identify correlated subsets of the parametric values based at least partly on the stream characteristic and the plurality of other stream characteristics to form correlated parametric values;
- classify a first subset of the correlated subsets of the parametric values as non-anomalous; and
- generate an anomaly threshold for the data stream based at least partly on the first subset.

16. The system of claim 13, wherein the data-stream computing device is further configured to generate at least one of alert data or corrective action data.

17. The system of claim 13, wherein the user interface portion is configured to generate the programmatic call responsive to activation of an interactive element of the user interface portion.

18. Non-transitory computer-readable storage storing executable instructions that configure a computing system to perform a process comprising:
- receiving message data from one or more computing devices, wherein message data received from a first computing device of the one or more computing devices is associated with a programmatic call relating to transacting rental of real property, generated by a user interface portion of a plurality of user interface portions concurrently displayed on the first computing device;
- classifying the message data into classified subsets of messages, wherein a classified subset of messages of the classified subsets of messages is classified based at least partly on a user interface portion from which individual messages in the classified subset of messages were generated;
- appending the classified subset of messages to a log file, the log file including a number of independently-accessible partitions;
- generating a plurality of data streams using the classified subsets of messages, wherein a data stream of the plurality of data streams comprises the classified subset of messages;
- determining, based at least partly on the message data, a subset of rental properties to be presented on a computing device;
- determining a stream characteristic of the data stream;
- detecting an anomaly associated with the data stream based at least partly on the stream characteristic; and
- generating anomaly resolution data regarding the anomaly.

19. The non-transitory computer-readable storage of claim 18, wherein determining the stream characteristic is performed in substantially real-time as data in the data stream transits between a broker computing device storing the classified subsets of messages and a consumer computing device configured to consume the data in the data stream.

20. The non-transitory computer-readable storage of claim 18, wherein the process further comprises:
- identifying a plurality of parametric values using (1) the stream characteristic and (2) a plurality of other stream characteristics;
- identifying a correlated subset of the plurality of parametric values based at least partly on the stream characteristic and the plurality of other stream characteristics;
- classifying the correlated subset of the plurality of parametric values as non-anomalous; and
- generating an anomaly threshold based at least partly on the correlated subset of the plurality of parametric values.

* * * * *

UNITED STATES PATENT AND TRADEMARK OFFICE
CERTIFICATE OF CORRECTION

PATENT NO. : 10,108,480 B2
APPLICATION NO. : 14/935215
DATED : October 23, 2018
INVENTOR(S) : Rene X. Parra Page 1 of 1

It is certified that error appears in the above-identified patent and that said Letters Patent is hereby corrected as shown below:

In the Claims

In Column 22, Line 48, Claim 13, change "call" to --call,--.

In Column 23, Line 45, Claim 18, change "call" to --call,--.

Signed and Sealed this
Twenty-fourth Day of March, 2020

Andrei Iancu
*Director of the United States Patent and Trademark Office*